United States Patent [19]

Cuscurida et al.

[11] 4,021,383

[45] May 3, 1977

[54] INFUSED POLYMER CONTAINING MONOHYDRIC COMPOUNDS AND POLYURETHANE COMPOSITIONS BASED THEREON

[75] Inventors: Michael Cuscurida; Lee G. Meyer; Lewis W. Watts, Jr., all of Austin, Tex.

[73] Assignee: Texaco Development Corporation, New York, N.Y.

[22] Filed: Dec. 22, 1975

[21] Appl. No.: 642,979

[52] U.S. Cl. .................. 260/2.5 AM; 260/2.5 AP; 260/77.5 AP; 260/77.5 CR; 260/614 AA; 260/615 R; 260/615 B
[51] Int. Cl.$^2$ ................ C08G 18/14; C08G 18/63; C07G 43/04
[58] Field of Search ............. 260/77.5 CR, 2.5 AM, 260/2.5 AP, 77.5 AP, 614 AA, 615 R, 615 B

[56] References Cited

UNITED STATES PATENTS

| | | | |
|---|---|---|---|
| 3,652,639 | 7/1972 | Pizzini et al. | 260/75 NN |
| 3,823,201 | 3/1972 | Pizzini et al. | 260/33.4 R |
| 3,981,907 | 9/1976 | Hattori et al. | 260/614 AA |

FOREIGN PATENTS OR APPLICATIONS 788,155  2/1973  Belgium ...................... 260/33.4 R

OTHER PUBLICATIONS

DOS 2,148,156, Mar. 1972, ICI.

*Primary Examiner*—H.S. Cockeram
*Attorney, Agent, or Firm*—Carl G. Ries; Thomas H. Whaley; Lee G. Meyer

[57] ABSTRACT

Disclosed is a novel infused polymer containing monohydric composition useful in producing improved urethane products. The novel composition is characterized as a polymer containing monohydric composition wherein the polymeric moiety is chemically attached or "infused" into the unsaturation sites of an oxyalkadienyl moiety which is covalently bonded to an acyclic monohydric compound.

17 Claims, No Drawings

INFUSED POLYMER CONTAINING MONOHYDRIC COMPOUNDS AND POLYURETHANE COMPOSITIONS BASED THEREON

BACKGROUND OF THE INVENTION

1. Field of the Invention

The present invention relates to novel polymer containing monohydric compositions; and more particularly, to an improved infused polymer containing monohydric composition prepared by infusion of certain polymerizable monomers onto unsaturation sites of an oxyalkadienyl containing monohydric alcohol.

2. Prior Art

"Polyurethane" is generally descriptive of a broad class of polymeric materials which contain numerous urethane linkages throughout the structure. Such materials are produced by the reaction of a material containing one or more free isocyanate moieties with a material containing one or more active hydroxyl groups. The interaction of a free isocyanate with an active hydroxyl yields a urethane linkage.

Polyutrethane compositions are conventionally prepared by the use of a polyfunctional free isocyanate containing material and a polyfunctional hydroxyl containing material such as a polyester or polyether polyol. The polyfunctionality of the reactants provides crosslinking which strengthens the material.

Monohydric substances, although reactive with a free isocyanate containing material, are generally employed in various amounts in polyurethane formulations to provide an elastomeric effect. These compounds act as chain stoppers. Since the monohydric compounds are monofunctional, they do not readily lend themselves to crosslinking. See for example U.S. Pat. No. 3,875,086 to Ramey et al.

It has been disclosed that the polyfunctional hydroxy containing materials dispersed in a polymer medium are effective in producing superior polyurethane foams. These mixtures have become known in the art as polymer polyols and are sometimes referred to as graft polymers. Examples of such compositions and their use are found in U.S. Pat. No. 3,383,351.

These graft polyols are formed by the in situ polymerization of a monomer in the presence of a saturated polyol medium. Purportedly, during the reaction, one or more of the monomers is "grafted" to the saturated polyol constituent by displacement of a hydrogen with the resultant formation of the covalent bond. The actual occurrence of this grafting of monomer to polyol containing chain has been shown slight in relation to the formation of the vinyl polymer. Thus, these polymer/polyols are in actuality an intimate admixture.

Purportedly the utilization of these polymer/polyol mixtures in urethane formulations yields polyurethane compositions having certain desirable physical properties while providing a plurality of active hydroxy sites for crosslinking the nucleus of the polyol constituent into the polyurethane network. However, the polymeric moiety is not bonded to the polyol moiety and thus not "chemically linked" into the resulting urethane composition.

Attempts to chemically bond or infuse the polymeric constituent into the polyol or monohydric compound have not generally met with success. One method involves the introduction of ethylenic unsaturation into the polyol structure by reaction of a polyhydric initiator with an organic compound having both ethylenic unsaturation and a reactive functional group such as hydroxyl or carboxyl. See, for example, U.S. Pat. No. 3,652,639.

These compounds are generally prepared by reacting dicarboxyl terminated moieties containing ethylenic unsaturation or a moiety containing both an epoxide and ethylenic unsaturation with a polyol. When an epoxide is used, the ring opening reaction yields a secondary hydroxyl. Upon alkoxylation to produce the very desirable polyether product, the secondary alcohols do not alkoxylate readily.

When the dicarboxyl containing material or the corresponding anhydride is utilized, crosslinking can occur. Specifically, the reactive carboxyl group can react with for example two hydroxy moieties on a single polyol molecule producing a "cyclic" type product. Thus, hydroxy moieties contained within this cyclic structure can be hindered in the subsequent isocyanate reaction. Additionally, since the carboxyl containing moiety is difunctional, it can act as a crosslinking agent to tie two polyol containing compounds together. This increases viscosity, reduces functionality, and can produce a solid product if the conditions are not carefully controlled. The carboxyl/hydroxy linkages formed are esters which cannot be readily alkoxylated. Further, remaining unreacted carboxyl groups must be esterified by use of an alcohol.

It has now been found that a novel class of polymer containing monohydric compounds which are better characterized as infused polymer containing monohydric compounds exhibit exceptional stability, do not undergo large viscosity changes upon prolonged storage, have an exceptionally high portion of polymerized monomer fused into the monohydric containing structure and can be readily alkoxylated. One outstanding advantage is that a single chain substituent carries two ethylenic unsaturated sites to the polyol molecule. Additionally, these compounds do not contain a second functional group on the unsaturation containing chain and thus will not crosslink or cyclize during preparation.

Further, it has been discovered that this novel class of polymer containing monohydric compounds used in concentrations as small as 5% by weight of the polyol component unexpectedly enhance the physical properties of polyurethane compositions. Surprisingly, large quantities of the novel monohydric compound can be used to effect improvements without substantial deterioration of other properties, i.e., about 50%.

SUMMARY OF THE INVENTION

According to the broad aspects of the instant invention, an infused polymer containing monohydric composition having at least one polymeric chain chemically bonded through one or more unsaturation sites of an oxyalkadienyl containing monohydric compound is provided.

Preferably the polymer containing monohydric compound is prepared by the in situ polymerization of at least one ethylenically unsaturated monomer in a reaction medium comprising the oxyalkadienyl containing monohydric compound.

The oxyalkadienyl containing monohydric compounds are preferably produced by contacting certain acyclic conjugated dienes with an acyclic polyol in the presence of a catalytically effective amount of a catalyst system consisting essentially of a divalent palladium complex, and at least one trivalent organophosphine ligand.

According to another aspect, the infused polymer containing monohydric compounds are used to produce improved urethane compositions.

DESCRIPTION OF PREFERRED EMBODIMENTS

According to a preferred embodiment, an infused polymer containing monohydric compound is prepared by the in situ free radical catalyzed polymerization of acrylonitrile and a styrene co-monomer in a ratio of from about 1:3 to about 3:1 by weight of acrylonitrile to styrene at temperatures in the range of from about 50° C to about 150° C in a reactive medium of an oxyoctadienyl polyether monohydric alcohol.

The oxyoctadienyl polyether monohydric compound is prepared in a separate step by admixing an aliphatic polyol having a functionaltiy of from about 2 to about 6 with an excess of butadiene in the presence of a catalyst system consisting essentially of palladium acetate, triphenylphosphine and zinc acetate at temperatures of about 75° C to about 150° C and at a pressure sufficient to maintain the reactants substantially in liquid phase and separating from the resulting product an oxyoctadienyl alcohol having one hydroxyl moiety and one or more oxyoctadienyl moieties depending upon the starting polyol. The separated product is then alkoxylated in accordance with well known methods to produce the corresponding oxyoctadienyl polyether monohydric compound.

ETHYLENICALLY UNSATURATED MONOMERS

The monomers useful in forming the infused polymer containing monohydric compounds according to the instant invention are the polymerizable ethylenically unsaturated monomers characterized by the presence therein of at least one polymerizable ethylenic group. The monomers can be used singly to produce a homopolymer containing monohydric compound or in combination to produce a copolymer containing monohydric compound.

These monomers are well-known in the art and include the hydrocarbon monomers such as butadiene, isoprene, 1,4-pentadiene, 1,6-hexadiene, 1,7-octadiene, styrene, α-methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluorostyrene, iodostyrene, cyanostyrene, nitrostyrene, N,N-dimethylaminostyrene, p-vinyl diphenyl sulphide, p-vinylphenyl phenyl oxide, and the like; the acrylic and substituted acrylic monomers, such a methylacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, butyl acrylate, 2-ethyl hexyl acrylate, phenyl acrylate, phenyl methacrylate, α-chloroacrylonitrile, and the like; the vinyl esters and vinyl ethers, such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl naphthalene, vinyl bromide, vinyl fluoride, vinylidene bromide, 1-chloro-1-fluoroethylene, vinylidene fluoride, vinyl methyl ether, vinyl ether ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 2-butoxy-2'-vinyloxy diethyl ether, vinyl 2-ethylmercaptoethyl ether, vinyl methyl ketone, vinyl ethyl ketone, vinyl phenyl ketone, and the like; dimethyl fumarate, dimethyl maleate, monomethyl itaconate, dimethylaminoethyl methacrylate, glycidyl acrylate, dichlorobutadiene, vinyl pyridine, and the like. Any of the known polymerizable monomers which are not reactive with the hydroxyl group can be used and the compounds listed above are illustrative and not restictive of the monomers suitable for use in this invention.

The ethylenically unsaturated monomers which are preferred in the practice of this invention include the hydrocarbon monomers such as butadiene, isoprene, styrene, α-methylstyrene, and the like; and the acrylic and substituted acrylic monomers which are non-reactive with isocyanato groups, such as methyl acrylate, methyl methacrylate, acrylonitrile, and methacrylonitrile.

Especially preferred in the practice of this invention is a mixture of acrylonitrile with one or more of the previously mentioned hydrocarbon monomers in a weight of acrylonitrile to co-monomer of from about 1:3 to about 3:1. For economic reasons, styrene is the most preferred hydrocarbon monomer, and thus the most preferred mixture of monomers for use in the practice of this invention comprises a mixture of acrylonitrile and styrene.

THE OXYALKADIENYL MONOHYDRIC COMPOUNDS

The oxyalkadienyl monohydric compounds useful in the instant invention can be generally characterized as acrylic compounds having at least one oxyalkadienyl moiety and one free hydroxy group. These compounds thus can include oxyalkadienyl aliphatic monohydric compounds and oxyalkadienyl polyether monohydric compounds as more particularly herein described. The oxyalkadienyl aliphatic monohydric compounds in accordance with this invention contain one or more oxyalkadienyl moieties covalently bonded to the backbone of an aliphatic initiator which contains one free hydroxyl group. These compounds are preferably prepared by intimately contacting an acyclic conjugated diolegin with an acyclic polyol in the presence of the catalyst system comprising a divalent palladium complex and at least one trivalent organophosphine ligand.

In accordance with this method of preparation, the acyclic conjugated olefin undergoes in situ dimerization and simultaneous addition to a polyol hydroxy oxygen. A mixture of oxyalkadienyl alcohol derivatives is obtained depending upon the number of oxyalkadienyl groups added and the polyol. These products range from completely oxyalkadienylated material to that material containing only one oxyalkadienyl moiety.

The polyols useful in preparing the oxyalkadienyl aliphatic monohydric compounds are generally acyclic materials having a functionality of from 2 to about 6 and preferably from 2 to about 3. The term functionality as used herein relates to the number of active hydroxy substituents. Any acyclic polyol may be employed which does not contain substituents deleterious to the alkadienyl addition. Preferably the aliphatic chain containing the free hydroxy constituent is a hydrocarbon.

The conjugated diolefins which are useful in preparing the oxyalkadienyl polyols in accordance with the above method are those of the formula:

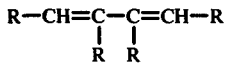

wherein R, independently, is hydrogen, chlorine or a hydrocarbon moiety of from 1 to 10 carbon atoms, selected from the group of alkyl, cycloalkyl, alkenyl, cycloalkenyl, aryl, aralkyl and alkaryl. Preferred conjugated diolefins are those of the formula:

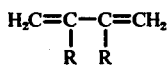

wherein R is as previously defined. Especially preferred in the practice of this invention are conjugated diolefins of the preceding formula wherein R, independently, is hydrogen, chlorine or methyl. Illustrative conjugated olefins include 1,3-butadiene, isoprene, chloroprene, 2,3-dimethyl-1,3-butadiene, and the like. For economic reasons, the most preferred conjugated diolefin employed in the practice of this invention is 1,3-butadiene.

The catalyst system which is employed in preparing the oxyalkadienyl aliphatic polyols in accordance with the above method comprises a divalent palladium compound in admixture with a trisorganophosphine ligand. Preferably an effective amount of a substance which in the presnce of the remainder of the reaction systems acts as a Lewis acid is also present in the catalyst system. The palladium compounds which are particularly useful are the divalent palladium salts of organic monocarboxylic acids having from 2 to about 8 carbon atoms. Illustrative of such divalent palladium compounds are palladium acetate, palladium propionate, and the like. Especially preferred in the practice of this invention is palladium acetate.

The amount of divalent palladium compound which is employed in the palladium-based catalyst system will depend of course upon the particular conjugated diolefin being oligomerized and the particular polyhydric alcohol to which the oligomerized diolefinic moiety is reacted. Generally, the divalent palladium compound is employed in an amount such that the mole ratio of palladium to conjugated diolefin is from about 0.00001 to about 0.01, with an amount of from about 0.0001 to about 0.001 on the same basis being preferred.

The phosphine ligands which are useful with the divalent palladium-based catalyst system are trisorganophosphines of the general formula:

$R_3P$ wherein R, independently, is an organo group having from 1 to 20 carbon atoms, preferably from 1 to 10 carbon atoms, and having only aromatic unsaturation. R is, therefore, alkyl, cycloalkyl, alkaryl, aryl, and aralkyl. R can also be substituted hydrocarbyl containing besides atoms of carbon and hydrogen other atoms such as oxygen, nitrogen and halogen and the like which can be present in functional groups.

In the phosphine ligand as herein defined, the R moieties are the same, or are different, although ligands wherein all R groups are the same are generally preferred for economic reasons. Exemplary ligands include phosphines such as triethylphosphine, tributylphosphine, triphenylphosphine, tris(4-methoxyphenyl)phosphine, tris(4-tolyl)-phosphine, tribenzylphosphine, and the like. In general, phosphine ligands wherein the substituents are aromatic are generally preferred over wholly aliphatic phosphine ligands, and largely because of economic reasons triphenylphosphine is a particularly preferred ligand.

The amount of phosphine ligand which is employed in the divalent palladium-based catalyst system is generally such that the mole ratio of phosphine ligand to divalent palladium compound is from about 1:1 to about 10:1, with a ratio of from about 2:1 to about 5:1 on the same basis being preferred.

The catalyst system additionally preferably employs a compound or complex which acts as a Lewis acid in the presence of the remainder of the reaction medium. This substance can be generally characterized as a promoter which promotes a more stable and more active catalyst system. Lewis acid acting promoters which have been found particularly useful in the catalyst system of this invention include certain metal salts of organic monocarboxylic acids having from 2 to about 8 carbon atoms. The metal salts which have been found suitable as promoters are those of zinc, cadmium, antimony, tin and iron. Illustrative promoters include zinc acetate, cadmium propionate, antimony acetate and the like. Especially preferred as a promoter in the catalyst system of this invention is zinc acetate.

The aformentioned promoters are effective in the catalyst system when employed in a concentration such that the mole ratio of promoter to divalent palladium compound is from about 1:10 to about 10:1, with an amount of from about 1:2 to about 4:1 being preferred.

As previously mentioned, the oxyalkadienyl monohydric compounds employed in this invention are formed by the catalyzed in situ oligomerization of the conjugated diolegin in the polyol. In the reaction the diolefin oligomerizes and simultaneously reacts with one or more hydroxyl groups of the polyol. The resulting compound is a mixture of unsaturation containing alcohols of reduced functionality in which the unsaturation consists of one or more oxyalkadienyl constituents attached to the polyol structure. The reaction is conducted in the liquid phase generally at a temperature of from about 50° C to about 200° C, with a temperature in the range of from about 75° C to about 150° C being preferred. The pressure at which the reaction is carried out is generally that pressure sufficient to maintain the reactants essentially in the liquid phase. Generally, a pressure of from about 15 psig to about 1,000 psig is satisfactory, with a pressure of from about 50 psig to about 500 psig being preferred.

The reaction of the conjugated diolefin to form the corresponding oligomer and the concurrent reaction of the oligomer moiety with the polyol to form the oxyalkadienylated product does not require the use of a solvent. However, the reaction can be carried out in the presence of an organic solvent which is inert to the reaction environment. The use of a solvent may be particularly desirable whenever the polyol reactant is of a low order of solubility in the reaction medium, such as for example, when sucrose is the polyol reactant. Also the use of a solvent generally facilitates the reaction by improving the solubility of the conjugated diolefin and the polyol reactant. Illustrative suitable solvents which may be employed in practicing the process include dimethylformamide, dimethylacetamide, N-methylpyrrolidone, and the like.

The reaction herein described between the conjugated diolefin and the polyol to form the unsaturated monohydric alcohols employed in this invention may be carried out batchwise or as a continuation process. The reaction time required in order to effect the oligomerization of the conjugated diolefin and its reaction with the polyol will depend, of course, upon the particular conjugated diolefin and polyol selected. Generally, a reaction time of from about 1 to about 12 hours is satisfactory, with a reaction time of from about 2 to about 6 hours being preferred.

The crude reaction product obtained by carrying out the reaction of the conjugated diolefin with the polyol, as herein described, comprises unreacted conjugated diolegin, unreacted polyol reactant, the palladium-based catalyst system and a mixture of various reaction products. The unreacted conjugated diolefin and unreacted polyol may be recovered from the crude reaction mixture and recycled for reuse. The catalyst system may be recovered from the crude reaction mixture and likewise recycled for reuse. The monohydric containing substituents can be effectively separated from the reaction product by conventional methods such as distillation.

The oxyalkadienyl polyether monohydric compounds of the instant invention are prepared in one of two ways. According to the first method, an oxyalkadienyl aliphatic monohydric compound is prepared as described herein above. The reaction product is then alkoxylated in accordance with well known procedures with an alkoxylation catalyst such as an alkali metal hydroxide. The alkoxylation is continued until a product of desired molecular weight is obtained. A product of molecular weight of from 500 to about 3000 is preferred. In accordance with this first method, the oxyalkadienyl moiety(ies) are directly attached to the backbone of the polyhydric initiator.

In accordance with the second method, the polyol initiator is first alkoxylated as above described and the resulting polyether polyol is then alkadienylated as herein before described. In accordance with this second method, the oxyalkadienyl moiety(ies) are attached at the termination of a polyether chain. It will be realized by the skilled artisan that a combination of these methods can be employed such that for example the polyol initiator is initially alkoxylated, then alkadienylated, and then further alkoxylated.

Whether the first method, the second or a combination is employed, the alkoxylation can be carried out with an alkylene oxide such as ethylene oxide, propylene oxide and butylene oxide, or mixtures thereof in the presence of an alkoxylation catalyst. The addition may be heteric, block or a combination thereof. When primary hydroxy "capping" is desired, the product is reacted with ethylene oxide in order to acquire necessary primary hydroxyl group termination of the polyether chains. This process is described in U.S. Pat. No. 3,336,242 for example.

Preferred aliphatic polyols are trimethylolpropane, glycerol, 1,2,6-hexanetriol, ethylene glycol and the like. The most preferred is ethylene glycol. Preferred polyether polyols which are formed prior to alkadienylation include polyols having a functionality of from 2 to about 6 and having a molecular weight of from about 500 to about 10,000. The polyether polyols are present in the formula:

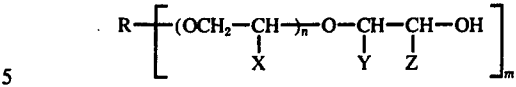

wherein R is the nucleus of an aliphatic polyhydric initiator having from 2 to about 12 carbon atoms and from 2 to 6 hydroxyl groups, Z is an alkyl radical of from 1 to 4 carbon atoms, X and Y, independently, are hydrogen or Z, n has an average value of from 0 to about 50, and $m$ is from 2 to 6, corresponding to the number of hydroxyl groups.

The preferred polyether polyols are the polyether diols and triols having a molecular weight of from about 500 to about 7,000, and more preferably from 500 to about 3,000 and having from about 25 percent to about 90 percent primary hydroxyl groups. These polyols may be used alone, in combination, or in a mixture with other polyether polyols.

THE REACTION CONDITIONS

The infused polymer containing monohydric compounds of the instant invention are prepared by the in situ polymerization of the ethylenically unsaturated monomer(s) in a reactive medium comprising the oxyalkadienylated aliphatic polyol having a single active hydroxy or the oxyalkadienylated polyether polyol having a single active hydroxy or mixtures thereof at a temperature of from about 50° C to about 150° in the presence of a catalytically effective amount of a conventional free radical catalyst known to be suitable for the polymerization of ethylenically unsaturated monomers. The concentration of the catalyst can vary from about 0.25 to about 2.5 percent, with an amount of from about 1.0 to about 2.0 percent being preferred. However, any effective catalytic amount is satisfactory.

Illustrative free radical catalysts which are effective in the practice of this invention are, for example, the peroxides and the azo compounds, including benzoyl peroxide, acetyl peroxide, t-butyl peroxide, α-cumyl peroxide, propyl peroxide, isopropyl peroxide, isopropyl-t-butyl peroxide, t-butyl lauryl peroxide, furoyl peroxide, triphenylmethyl peroxide, p-methoxybenzoyl-peroxide, p-monomethoxybenzoyl peroxide, t-butyl peroxybenzoate, diethyl peroxyterephthalate, α,α'-azo-2-methylbutyronitrile, α,α'-azo-2-methyl heptonitrile, 1,1'-azo-1-cyclohexane carbonitrile, dimethyl α-α'-azo-isobutyrate, azobisisobutyronitrile, and the like. The preferred free radical catalysts are the azo compounds, and especially preferred is azobisisobutyronitrile.

The amount of ethylenically unsaturated monomer, which is polymerized and incorporated into the polymer containing monohydric compound of this invention will vary, depending upon the particular monomers employed, as well as upon the properties desired in the polyurethane composition which is to be prepared from the polymer containing alcohol. In general, the ethylenically unsaturated monomer comprises from about 5 to about 25 percent by weight of the polymer containing alcohol composition, with an amount of from about 10 to about 20 percent by weight being preferred.

In carrying out the aforementioned in situ polymerization, the monomer(s) is added to the oxyalkadienyl monohydric composition along with the selected free radical polymerization catalyst, and the polymerization reaction is allowed to proceed under an inert atmosphere at a temperature of from about 50° C to about 150° C until the polymerization reaction is completed. In another embodiment of this invention, the desired monomer(s) is added to the monohydric composition incrementally over a period of time in order to control the rate at which the polymerization reaction proceeds. At the end of the polymerization reaction, the unreacted monomers are then removed from the reaction product, as for example, by vacuum stripping.

The infused polymer containing monohydric compositions of this invention are particularly useful in preparing polyurethane compositions of improved physical properties. Polyurethane foams prepared according to this invention are the reaction products of a free isocyanate containing component and a reactive hydroxy containing component. The foam can be produced by conducting the above reaction catalytically in the presence of water, and optionally an inert blowing agent.

The reactive hydroxy containing component comprises a polyether polyol and an effective amount of the infused polymer containing monohydric compound of this invention. The infused polymer containing monohydric compound is generally employed in an amount of from about 5 to about 50 wt. % based on the weight of the polyether polyol with an amount of from about 10 to about 40 wt. % being preferred.

The polyether polyols employed can include polyols having a functionality of from 2 to about 6, and having a molecular weight of from about 2,000 to about 10,000. These polyether polyols include the same polyether polyols herein described as useful in the preparation of the oxyalkadienyl polyol compositions.

The preferred polyether polyols are the polyether diols and triols having a molecular weight of from about 2,000 to about 7,000, and having about 25% to about 90% primary hydroxyl groups. These polyols can be used alone, in combination, or in admixture with other polyether polyols.

Especially preferred polyether polyols are the polyether triols having a molecular weight of from about 4,000 to about 7,000, and from about 40% to about 80% primary hydroxy groups. Triols having molecular weights of about 3,000 can be used to produce a flexible polyurethane foam but are not preferred.

Preferred polyether diols are, for example, polypropylene glycols or mixed polypropylene glycol polyethylene glycol copolymers having a molecular weight from about 500 to about 2,500. These materials are produced by reacting ethylene oxide, propylene oxide, or a butylene oxide, either sequentially or in admixture with an initiator such as, for example, ethylene glycol, propylene glycol or butylene glycol.

The active hydroxy containing component previously above described, is reactd with the free polyisocyanate containing component in order to produce the instant inventive polyurethane compositions.

The free isocyanate containing component can be generally described as an organic polyisocyanate. Suitable organic polyisocyanates are those organic diisocyanates, triisocyanates and polyisocyanates well known to those skilled in the polyurethane art. Mixed isomers of toluene diisocyanate which are readily available commercially, such as those described in U.S. Pat. No. 3,298,976 can be used. Preferred are diisocyanates and higher functionality polyisocyanates prepared by the phosgenation of the reaction product of aniline and formaldehyde, such as diphenylmethane diisocyanate in its various isomeric forms, and higher functionality polymethylene polyphenyl polyisocyanates such as those described in U.S. Pat. No. 3,362,979 for example. These polymethylene polyphenyl polyisocyanates generally have an average functionality of from greater than 2.0 to about 3.3.

An especially preferred organic polyisocyanate useful in the practice of our invention is the polymethylene polyphenyl polyisocyanate having a functionality of from about 2.2 to about 2.8.

In producing the polyurethane compositions of the invention, the free isocyanate containing component and the hydroxy containing component are combined such that the resulting ratio of isocyanate groups to hydroxyl groups, known as the isocyanate index, ranges from about 0.9:1 to about 1.3:1. It is preferred that the isocyanate index ranges fro about 0.95:1 to about 1.3:1. It is within these ranges that the most desirable balance of advantageous physical properties and ambient temperature curing properties are achieved for the solid polyurethane elastomer products.

It has also been found desirable in many instances to include in the polyurethane formulation a cross-linker or chain extender. Traditionally, a number of cross-linkers or chain extenders have been employed in semi-flexible integral skin foams and elastomers. Such materials have also been used in some instances to prepare flexible foams, and the like. Conventional cross-linkers include aliphatic diols or polyols such as ethylene glycol, 1,4-butanediol, glycerol, glycerol-alkylene oxide adducts, trimethylolpropane, trimethylolpropane-alkylene oxide adducts, pentaerythritol-alkylene oxide adducts, sorbitol-alkylene oxide adducts, and the like. Amine cross-linkers commonly employed are triethanolamine, and its alkylene oxide adducts; alkylene oxide adducts of ethylenediamine, alkylene oxide adducts of diethylenetriamine; and the like. Other cross-linkers such as those disclosed in U.S. Pat. Nos. 3,382,284 and 3,072,582 can be suitably employed. Alkylene oxide adducts of aniline, methylene dianiline, chlorinated methylene dianiline and chlorinated benzidine are other representative cross-linkers. Chain extenders prepared by reacting monoalkanolamines with ethylene carbonate or propylene carbonate, as described in U.S. Pat. No. 3,595,814, can also be employed.

Desirably, the polyurethane formulation will include a suitable catalyst to promote one or more of the various possible reactions. Depending upon the type of urethane compositions desired, the skilled artisan will readily be able to select the appropriate catalytic material. Triethylenediamine; N-methyl or N-ethylmorpholine; N,N-dimethylcyclohexylamine; N,N-di-methylethanolamine; N,N'-dimethylpiperazine; trimethylamine; N,N'-bis (2-hydroxypropyl)-2-methyl piperazine; trimethylaminoethyl piperazine; N,N,N',N'-tetramethyl-1,3-propanediamine; tertiary polyoxyalkylene polyamines, as described in U.S. Pat. No. 3,660,319; 2-dimethylaminoethyl-3-dimethylaminopropyl ether; 2,2'-dimorpholinodiethyl ether; other amines as described in U.S. Pat. No. 3,330,782; and amine catalysts described in U.S. Pat. Nos. 2,941,967; 3,645,925; 3,661,808; and 3,313,744 are exemplary amine catalysts. Organometallic catalysts can also be used in combination with the amine catalyst or independently thereof. Organometallic compounds such as dibutyltin dilaurate; dibutyltin dioctoate; dioctyltin oxide; dimethyltin diacetate; phenylmercuric propionate; stannous octoate, and such organometallic catalysts as are described in U.S. Pat. Nos. 3,592,787; 3,419,509; 3,583,945; 3,398,106; 3,397,158; 3,075,927 and 3,084,177 are representative.

Polyurethane formulations of the instant invention which are employed in the preparation of polyurethane foams will include blowing agents. Preferably, a small amount of surfactant is employed in conjunction with the blowing agent. The blowing agent can be any of those known to be useful for this purpose, e.g., water, halogenated hydrocarbons, hydrocarbons, and the like. Flexible and semi-flexible foams are conventionally blown with carbon dioxide from the water-isocyanate reaction or a combination of water and a volatile blowing agent. The water level in such instances is generally in the range of about 1.5 to about 4.5 parts by weight based on the weight of the polyurethane formulation, and the volatile blowing agent level in such instances is generally in the range of 0 to 20 parts by weight depending, of course, on the density and hardness desired. Integral skin foams are generally blown with only an inert blowing agent. Generally, an amount in the range of about 5 to about 25 parts by weight, depending upon the density desired, is employed. Gas or gas producing materials which include the lower molecular weight alkanes, alkenes, dialkyl ethers, halogenated hydrocarbons, and the like, are suitable volatile blowing agents. Monoflurotrichloromethane; difluorodichloromethane; 1,1,2-trichloro, 1,2,2-trifluoroethane, dichlorotetrafluoroethane; methylene chloride and ethyl chloride are representative halogenated hydrocarbons.

Silicone oils such as those described in U.S. Pat. Nos. 2,834,748; 3,313,744 and 3,647,724 are representative surfactants that can be employed in preparing polyurethane foams. Depending on the properties and the utility desired of the polyurethane composition, various other compounds can be utilized. For example, various additives such as talc, mica, clay, titanium dioxide, carbon black, wood pulp, silica, barium sulfate, calcium carbonate, dyes, asbestos, fibrous glass, synthetic fibers, and the like, can be employed in the polyurethane formulation as fillers or for other purposes. Paraffin oils, castor oil, polyvinyl chloride, and other materials have been conventionally included, as well. The addition of other antioxidants or stabilizers, plasticizers, emulsifiers, wetting agents, smoke-inhibiting agents, fire retardants, and the like, can be employed as well.

The invention will be further illustrated by the following specific examples, which are given by way of illustration and not as limitations on the scope of this invention.

EXAMPLE I

This example shows the preparation of an oxyoctadienyl aliphatic monohydric compound of the instant invention. Into a clean, dry 1 liter autoclave was charged a mixture of 300 ml ethylene glycol, 1.0 g palladium acetate, 4.0 g triphenylphosphine and 4.0 g zinc acetate. After flushing the autoclave with nitrogen, 200 go f 1,3-butadiene was pressured into the clave. The resulting reaction mixture was heated at 109° C to 114° C for approximately two hours, during which time the pressure decreased from an initial 260 psig to 33 psig. Thereafter, the autoclave was cooled and the crude reaction product consisting of 526 g of material was first filtered through a filter aid and then stripped under vacuum. The filtered, stripped product was then extracted several times with water and the resultant material dried over calcium sulfate. The dried material was added to the product of Example II below.

EXAMPLE II

In this example, the procedure of Example I was repeated except that 1.0 g of zinc acetate was utilized and the reaction mixture heated at 100° C to 110° C for two hours, during which time the reaction pressure decreased from 210 psig to 22 psig. The crude reaction product consisting of 525 g of material was worked up as in Example I. The obtained product was combined with that of Example I. Analytical and spectral data of the combined product showed the major component to be the monooctadienylated adduct of ethylene glycol having hydroxyl number of 363.

EXAMPLE III

This example illustrates the preparation of an octadienyl containing polyether monohydric compound. Into a clean, dry, one-half gallon stirred autoclave were charged 150 g of the monooctadienylated adduct of ethylene glycol (admixed reaction product of Examples I and II), and 4.5 g of potassium hydroxide. The autoclave was sealed and evacuated. After purging with prepurified nitrogen, the admixture was heated to 110° C–115° C. Then, 150 g of propylene oxide was metered into the heated clave at 60 psig and allowed to react until an equilibrium pressure was obtained. The reaction product was neutralized with 22.4 g of a 25% aqueous oxalic acid mixture. In order to stabilize the product and aid recovery, di-t-butyl-p-cresol (0.6 g) and a commercial filter aid (3.0 g) were also added. The neutralized reaction product was vacuum stripped under reduced pressure and then filtered. The recovered product showed the following properties:

| Acid no., mg KOH/g | 0.64 |
|---|---|
| Hydroxyl no., mg KOH/g | 154 |

EXAMPLE IV

This example shows the preparation of a primary hydroxy terminated oxyoctadienyl containing polyether monohydric compound. Into a clean, dry, one-half gallon, stirred autoclave were charged 117.3 g of the octadienyl containing polyether monohydric compound of Example III and 10 g of 50% aqueous potassium hydroxide solution. The autoclave was evacuated and purged with purified nitrogen. The autoclave contents were heated to a temperature of 100° C and vacuum stripped to a minimum pressure. This was followed by nitrogen stripping for one-half hour. The stripped autoclave contents were then heated to a temperature of 110° C to 115° C and propylene oxide was metered into the kettle at a pressure of 60 psig. The contents were reacted until the pressure reached equilibrium.

The autoclave contents were then purged 30 minutes with nitrogen. Then 175 g of ethylene oxide was metered into the clave at 110°–115° C at 60 psig. The resulting reaction was allowed to proceed until an equilibrium pressure was obtained. The reaction product was then neutralized with 38.4 g of a 25% aqueous oxalic acid solution. Di-t-butyl-p-cresol (1.1 g) and a commercial filter aid (3.0 g) was then added to stabilize the product and facilitate filtering. The neutralized product was vacuum stripped under reduced pressure and then nitrogen stripped one-half hour. The stripped reaction product was then filtered and the filtrate showed the following properties:

| | |
|---|---|
| Acid no., mg KOH/g | 0.17 |
| Hydroxyl no., mg KOH/g | 28 |
| Water, wt. % | 0.07 |
| Unsaturation, meq/g | 0.35 |
| pH (10:6 isopropanol-water) | 6.9 |
| Color, Pt-Co | 400 |
| Sodium, ppm | 5.4 |
| Potassium, ppm | 37 |
| Peroxide, ppm | 1.5 |

EXAMPLE V

This example will show the preparation of the infused polymer containing polyether monohydric compounds of the instant invention. Into a clean, dry, 1 liter, 3-neck flask equipped with stirrer, thermometer, dropping funnel, water condenser and a nitrogen inlet and outlet tube was charged a mixture of 450 g of the ethylene oxide capped product of Example IV and 5.0 g azobisisobutyronitrile. The mixture was heated to 83° C and a mixture consisting of 25 g styrene and 25 g acrylonitrile was added incrementally over a one-half hour period. During the addition, the temperature rose to a maximum of 107° C. The flask contents were allowed to react for a period of about 2 hours and stripped at reduced pressure to remove unreacted monomer. Analysis showed monomer conversion was 92%. The resultant stripped product was an opaque, cream colored, viscous liquid which upon analysis showed the following properties:

| | |
|---|---|
| Acid no., mg KOH/g | 0.16 |
| Hydroxyl no., mg KOH/g | 25.9 |
| Water, wt. % | 0.06 |
| Unsaturation, meq/g | 0.25 |
| pH (10:6 isopropanol-water) | 7.1 |
| Viscosity, 25° C, cps | 1400 |

EXAMPLE VI

In this example urethane foams were prepared in accordance with the instant invention with varying amounts of the infused polymer containing polyether monohydric compound of Example V. The results are shown in Table I. Additionally, corresponding foams prepared without the use of the infused polymer containing monohydric compound and those prepared with a prior art polymer/polyol compounds are shown. As can be seen, the high resilient foams of the instant invention show improved properties.

TABLE I

| Foam No. | 4609-37C | 4819-78A | 4819-78B | 4819-78C | 4609-62A |
|---|---|---|---|---|---|
| Formulation, pbw | | | | | |
| THANOL SF-5503[a] | 100 | 90 | 75 | 60 | 50 |
| Commercial polymer/polyol[b] | — | — | — | — | 50 |
| Etylene glycol-butadiene infused polymer[c] | — | 10 | 25 | 40 | — |
| Water | 2.7 | 2.7 | 2.7 | 2.7 | 2.7 |
| L-5303 silicone[d] | 2.0 | 2.0 | 2.0 | 2.0 | 2.0 |
| DABCO LV-33[e] | 0.3 | 0.3 | 0.3 | 0.3 | 0.3 |
| THANCAT DM-70[f] | 0.25 | 0.25 | 0.25 | 0.25 | 0.25 |
| NIAX A-I[g] | 0.12 | 0.12 | 0.12 | 0.12 | 0.12 |
| Dibutyltin dilaurate | 0.02 | 0.025 | 0.025 | 0.025 | 0.02 |
| 80/20 toluene diisocyanate/PAPI[h] | 36 | 36.3 | 36.1 | 35.9 | 36 |
| Isocyanate index | 1.05 | 1.05 | 1.05 | 1.05 | 1.05 |
| Details of Preparation | | | | | |
| Cream time, sec. | 8 | 8 | 8 | 8 | 8 |
| Rise time, sec. | 165 | 180 | 180 | 180 | 150 |
| Gel time, sec. | 480 | 495 | 435 | 375 | 480 |
| Properties | | | | | |
| Density, pcf | 2.4 | 2.3 | 2.4 | 2.8 | 2.5 |
| Tensile, psi | 10.9 | 13.5 | 14.5 | 15.9 | 21 |
| Elongation, % | 127 | 168 | 178 | 187 | 122 |
| Tear, pli | 1.2 | 1.8 | 2.0 | 2.5 | 1.8 |
| Compression set (Method B) | | | | | |
| 50% | 24.3 | 15.1 | 19.5 | 34.7 | 19.6 |
| 75% | 18.0 | 18.2 | 20.0 | 43.2 | 16.7 |
| Humid aging (5 hrs. at 250° F) | | | | | |
| Compression set, 50% | 27.1 | 27.6 | 30 | 37.9 | 30.1 |
| CLD Lose (50%) | 29.7 | 21.7 | 17.8 | 10.6 | 30.8 |

ANNEX TO TABLE I
[a]Jefferson Chemical Co., high reactivity polyether triol; hydroxyl no. 32–36.
[b]Pluracol P-581; hydroxyl no. 26; BASF/Wyandotte
[c]Hydroxyl no. 25.9, product of Example V
[d]Union Carbide Chemical Corp.
[e]Air Products; 33% triethylenediamine in dipropylene glycol
[f]Jefferson Chemical Co.; 70:30 wt. blend of dimorpholinodiethylether and N,N'-dimethylpiperazine
[g]Union Carbide Chemical Corp.; bis-dimethylaminoethylether
[h]Upjohn Co.; polymeric isocyanate.

While the invention has been explained in relation to its preferred embodiment, it is to be understood that various modifications thereof will become apparent to those skilled in the art upon reading the specification and is intended to cover such modifications as fall within the scope of the appended claims.

What is claimed is:

1. An infused polymer containing monohydric composition having at least one polymeric chain chemically bonded through at least one unsaturation site of an oxyalkadienyl containing monohydric compound selected from the group consisting of oxyalkadienyl aliphatic monohydric compounds, oxyalkadienyl polyether monohydric compounds and mixtures thereof wherein said polymeric chain is the polymerization product of at least one polymerizable ethylenically unsaturated monomer.

2. The infused polymer containing monohydric composition of claim 1 wherein said polymeric chain is the polymerization product of at least one polymerizable ethylenically unsaturated monomer selected from the group consisting of vinyl chloride, vinyl acetate, methyl methacrylate, acrylonitrile and styrene; and wherein said oxyalkadienyl containing monohydric compound is an oxyoctadienyl polyether monohydric alcohol.

3. The infused polymer containing monohydric composition of claim 2 wherein said polymerizable ethylenically unsaturated monomer is a mixture of acrylonitrile and a co-monomer selected from the group consisting of vinyl acetate, vinyl chloride, methyl methacrylate, and styrene in a weight ratio of acrylonitrile to said co-monomer of from about 3:1 to about 1:3, wherein said oxyoctadienyl polyether monohydric compound is the alkadienylation product of 1,3-butadiene and a polyether polyol of the formula:

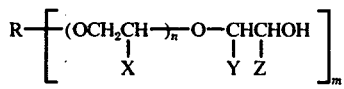

wherein R is the nucleus of an aliphatic polyhydric initiator having from 2 to about 12 carbon atoms and from 2 to 6 hydroxyl groups, z is an alkyl radical of from 1 to 4 carbon atoms, x and y, independently, are hydrogen or z, n has an average value of from 0 to about 50 and m is from 2 to 6 corresponding to the number of hydroxyl groups wherein said polyether polyol compound of the above formula has a molecular weight of from about 500 to about 7,000.

4. The infused polymer containing monohydric composition of claim 3 wherein said polymerizable ethylenically unsaturated monomer is a mixture of a crylonitrile and styrene; and wherein said polyether polyol is a polyether diol having molecular weight of from about 500 to about 3,000 and having from about 25% to about 90% primary hydroxyl group termination.

5. A method of preparing an infused polymer containing monohydric composition comprising the in situ polymerization of at least one polymerizable ethylenically unsaturated monomer in a relative medium comprising an oxyalkadienyl containing monohydric compound selected from the group consisting of oxyalkadienyl aliphatic monohydric compounds, oxyalkadienyl polyether monohydric compounds and mixtures thereof and an effective amount of a free radical catalyst.

6. The method of claim 5 wherein said polymerizable ethylenically unsaturated monomer is selected from the group consisting of vinyl chloride, vinyl acetate, methyl methacrylate, acrylonitrile and styrene and is present in an amount of from about 5 to about 25 weight percent of said oxyalkadienyl containing monohydric compound.

7. The method of claim 6 wherein said polymerizable ethylenically unsaturated monomer is a mixture of acrylonitrile and a co-monomer selected from the group of vinyl acetate, vinyl chloride, methyl methacrylate and styrene in a weight ratio of acrylonitrile to co-monomer of from about 3:1 to about 1:3 and wherein said oxyalkadienyl containing monohydric compound is an oxyoctadienyl polyether monohydric compound.

8. The method of claim 7 wherein said ethylenically unsaturated monomer is a mixture of acrylonitrile and styrene and said oxyoctadienyl polyether monohydric compound is the alkadienylation product of 1,3-butadiene and a polyether polyol of the formula

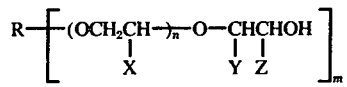

wherein R is the nucleus of an aliphatic polyhydric initiator having from 2 to about 12 carbon atoms and from 2 to 6 hydroxyl groups, z is an alkyl radical of from 1 to 4 carbon atoms, x and y, independently, are hydrogen or z, n has an average value of from 0 to about 50 and m is from 2 to 6 corresponding to the number of hydroxyl groups wherein said polyether polyol of the above formula has a molecular weight of from about 500 to about 7,000.

9. The method of claim 8 wherein said polymerizable monomer mixture is present in an amount of from about 10 to about 20 weight percent.

10. A method of producing an infused polymer containing monohydric composition comprising the steps of:
contacting a polyhydric composition selected from aliphatic polyols having from 2 to about 12 carbon atoms and from 2 to about 6 hydroxyl groups, and polyether polyols of the formula

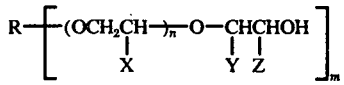

wherein R is the nucleus of an aliphatic polyhydric initiator having from 2 to about 12 carbon atoms and from 2 to 8 hydroxyl groups, z is an alkyl radical of from 1 to 4 carbon atoms, x and y, independently, are hydrogen or z, n has an average value of from 0 to about 50 and m is from 3 to 8 corresponding to the number of hydroxyl groups wherein said polyether polyol of the above formula has a molecular weight of from about 500 to about 7,000, with 1,3-butadiene in the presence of catalytically effective amount of a catalyst system consisting essentially of a divalent palladium complex, at least one trivalent organophosphine ligand, and an effective amount of a substance which in the presence of the remainder of the reaction system acts as a Lewis acid at a temperature of from about 50° to about 200° C and a pressure sufficient to maintain the reactants and by-products in liquid phase to produce an oxyoctadienyl monohydric composition.

admixing and polymerizing at least one polymerizable ethylenically unsaturated monomer in a reactive medium comprising said oxyoctadienyl monohydric composition and a catalytically effective amount of a free radical polymerization catalyst at temperatures of from about 50° C to about 150° C.

11. The method of claim 10 wherein said polyhydric composition in said aliphatic polyol, comprising the further step of:
alkoxylating said oxyoctadienyl monohydric composition prior to said polymerization step with an amount of an alkylene oxide, selected from propylene oxide, ethylene oxide, butylene oxide and mixtures thereof, sufficient to produce an oxyoctadienyl polyether monohydric composition of a molecular weight from about 500 to 3,000 in the presence of a catalytically effective amount of an alkali metal hydroxide alkoxylation catalyst.

12. A polyurethane composition prepared by admixing and reacting an organic free polyisocyanate containing component, a reactive polyhydroxy containing component and an effective amount of an infused polymer containing monohydric composition having at least one polymeric chain chemically boned through at least one unsaturation site of an oxyalkadienyl polyether monohydric alcohol wherein said polymeric chain is the polymerization product of at least one polymerizable ethylenically unsaturated monomer.

13. The polyurethane composition of claim 12 further comprising an effective amount of a suitable catalyst and a blowing agent wherein said effective amount of an infused polymer containing monohydric composition is an amount from about 5 to about 50 wt. % based on the weight of said reactive polyhydroxy containing component and wherein the ratio of free polyisocyanate containing component to reactive polyhydroxy containing component is such that the isocyanate index is from about 0.9 to about 1.3.

14. The polyurethane composition of claim 13 wherein said organic free polyisocyanate containing component is selected from diisocyanates and higher functionality polyisocyanates prepared by the phosgenation of the reaction product of aniline and formaldehyde having a functionality of from greater than 2.0 to about 3.1; wherein said reactive polyhydroxy containing component is a polyether polyol having molecular weight of from about 2,000 to about 7,000; wherein said polymeric chain is the polymerization product of at least one polymerizable ethylenically unsaturated monomer selected from the group consisting of vinyl chloride, vinyl acetate, methyl methacrylate, acrylonitrile and styrene; and wherein said oxyalkadienyl polyether monohydric composition is an oxyoctadienyl polyether monohydric alcohol.

15. The polyurethane composition of claim 14 wherein said polymerizable ethylenically unsaturated monomer is a mixture of acrylonitrile and a co-monomer selected from the group consisting of vinyl acetate, vinyl chloride, methyl methacrylate and styrene in a weight ratio of acrylonitrile to said co-monomer of from about 3:1 to about 1:3 and wherein said oxyoctadienyl polyether monohydric compound is the octadienylation product of 1,3-butadiene and a polyether polyol of the formula

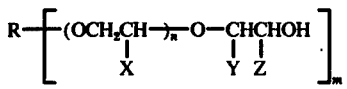

wherein R is the nucleus of an aliphatic polyhydric initiator having from 2 to about 12 carbon atoms and from 2 to 6 hydroxy groups, z is alkyl radical of from 1 to 4 carbon atoms, x and y, independently, are hydrogen or z, n has an average value of from 0 to about 50 and m is from 2 to 6 corresponding to the number of hydroxyl groups wherein said polyether polyol of the above formula has a molecular weight of from about 500 to about 7,000.

16. The polyurethane composition of claim 15 wherein said blowing agent is selected from water and mixtures of water and an inert blowing agent; wherein said reactive polyhydroxy containing component contains from about 40% to about 80% primary hydroxy groups; wherein said polymerizable ethylenically unsaturated monomer is a mixture of acrylonitrile and styrene; and wherein said polyether is a polyether diol having a molecular weight of from about 500 to 3,000 and having an average of from about 25% to 90% primary hydroxyl group termination.

17. A flexible polyurethane foam prepared by admixing and reacting
a free isocyanate containing component of a mixture of 80% by weight toluene diisocyanate and 20% by weight of a phosgenated aniline-formaldehyde condensation product, the mixture having a functionality of from about 2.2 to 2.8;
a reactive polyhydroxy containing component of a polyether triol having a molecular weight of from about 4,000 to 7,000 and having from 25% to about 90% primary hydroxyl termination;
from about 10% to 40% by weight based on the weight of the polyether polyol of an infused polymer containing monohydric composition in the presence of a catalytically effective amount of triethylenediamine and an effective amount of water utilized as a blowing agent;
wherein the ratio of the free polyisocyanate containing component to the reactive polyhydroxy containing component is such that the isocyanate index if from about 0.9 to about 1.3; and
wherein said infused polymer containing monohydric composition is prepared by the in situ free radical catalyzed polymerization of acrylonitrile styrene co-monomer mixture in a weight ratio of from about 1:3 to 3:1 of acrylonitrile to styrene at temperatures in the range from about 50° C to about 150° C in a reactive medium of an oxyalkadienyl polyether monohydric alcohol wherein said oxyalkadienyl polyether monohydric alcohol is the reaction product of a polyether polyol of the formula

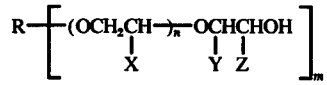

wherein R is a nucleus of an aliphatic polyhydric initiator having from 2 to about 12 carbon atoms and 2 to 8 hydroxy groups, z is an alkyl radical of from 1 to 4 carbon atoms, x and y, independently, are hydrogen or z, n has an average value of from 0 to about 50, m is from 2 to 8 corresponding to the number of hydroxy groups wherein said polyether polyol of the above formula has a molecular weight of from about 500 to about 7,000 and has from about 25% to about 90% primary hydroxyl group termination with a conjugated diolefin of the formula

wherein R, independently, is hydrogen chlorine or a hydrocarbon moiety of from 1 to 10 carbon atoms selected from the group of alkyl, cycloalkyl, alkenyl, cycloalkenyl, aryl, aralkyl and alkaryl in the presence of a catalytically effective amount of a catalyst system consisting essentially of a divalent palladium complex, at least one trivalent organophosphine ligand, and an effective amount of a substance which in the presence of the remainder of the reaction system acts as a Lewis acid at a temperature from about 50° C to about 200° C.

* * * * *